Sept. 12, 1933.  J. F. GAYLORD  1,926,940
CLUTCH SHIFTING MECHANISM FOR TRANSMISSION GEARS
Filed Feb. 26, 1931
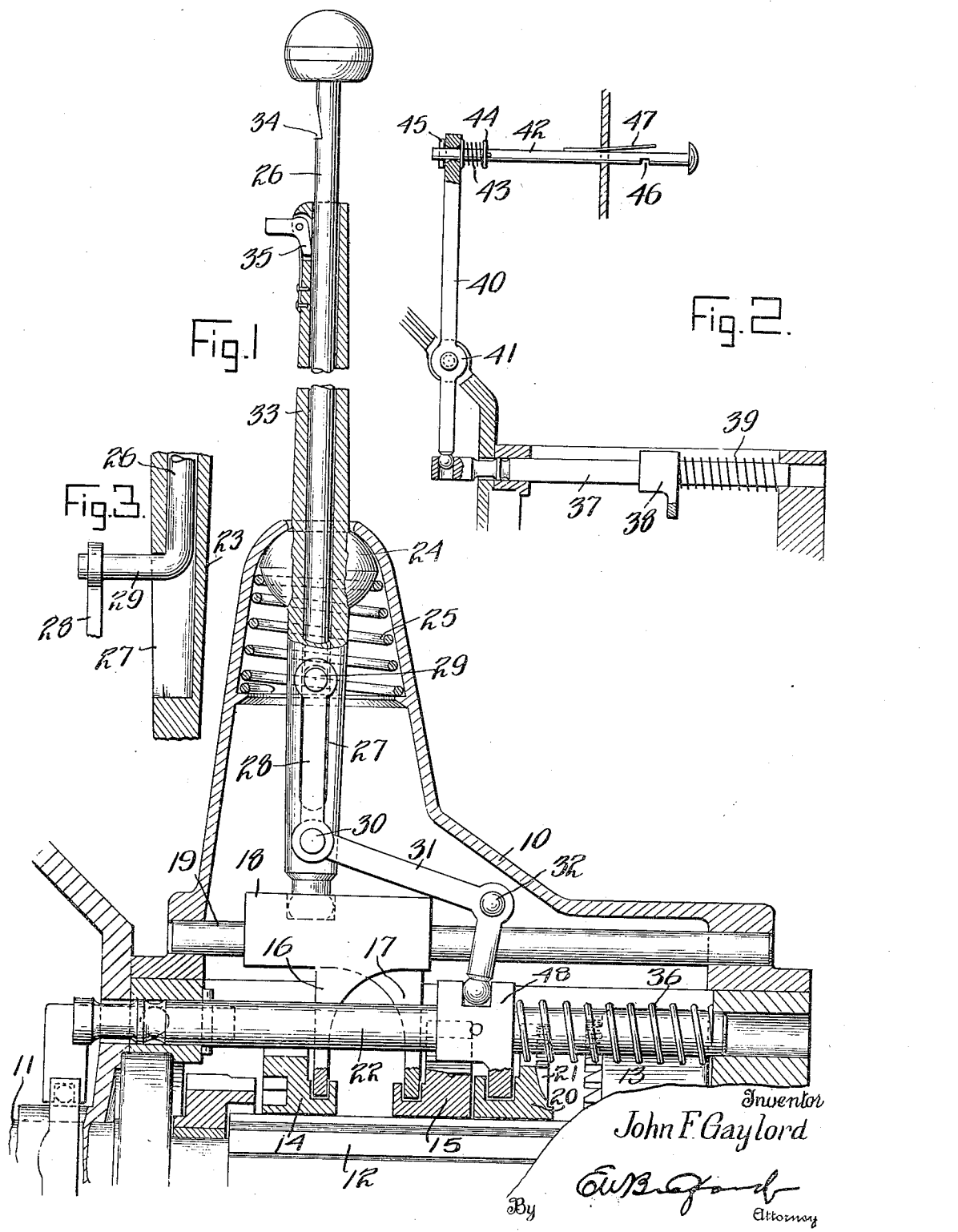
Inventor
John F. Gaylord
By
Attorney Patented Sept. 12, 1933

1,926,940

UNITED STATES PATENT OFFICE 1,926,940

CLUTCH SHIFTING MECHANISM FOR TRANSMISSION GEARS

John F. Gaylord, Muncie, Ind., assignor, by mesne assignments, to The Gaylord Company, Inc., Homer, La., a corporation of Louisiana Application February 26, 1931. Serial No. 518,521

5 Claims. (Cl. 192—99)

This invention relates to clutch shifting mechanism for transmission gears. In certain types of automobile transmission gears, there is provided an auxiliary clutch for connecting the driving with the driven shaft. An object of the present invention is to provide means for operating this auxiliary clutch which means shall be simple and reliable. One type of structure to which the invention is particularly adapted is that shown in my co-pending application Ser. No. 504,890, filed December 26, 1930 for transmission gears. The invention, however, is not limited in its use to this particular type of a gear transmission for it may be adapted for use with any suitable mechanism.

Referring to the accompanying drawing, which is made a part hereof and on which similar reference characters indicate similar parts, Figure 1 is a vertical section through the housing and gear of a motor vehicle transmission with my device applied thereto, Figure 2, a detail view of a modified form of lever used with the invention, and Figure 3 is a section on line 3—3 of Figure 1.

In the drawing numeral 10 indicates the usual gear housing in which are journaled a driving shaft 11, an intermediate shaft 12 and a driven shaft having gear teeth 13 on its inner end. The intermediate shaft has mounted thereon gears 14 and 15 which are movable axially on the shaft by means of depending fingers 16 and 17 which are secured to collars, one of which is shown as 18 and is slidable on a rod 19 which is secured in the housing 10. Slidably mounted on the shaft 12 is a ring gear 20 which has gear teeth 21 which are brought into mesh with the gear teeth 13 on the driven shaft. The ring 20 is moved into and out of engagement with the gear 13 by means of a fork 48 secured upon an axially movable rod 22. The rod 22 is similar in many respects to that shown in the co-pending application referred to. A hollow gear shifting lever 23 is positioned in the gear housing and has an enlarged portion 24 upon which it is pivotally mounted in the upper cone-like portion of the gear housing 10 being held in elevated position by means of spring 25. The lower end of the lever is movable to engage a notch in one of the blocks 18 for shifting the gears in well-known manner. Positioned within the lever 23 is an operating plunger 26. The lower end of this plunger is bent at right angles and extends out through a slot 27 in the lower end of the lever 23. A link 28 is pivoted to the bent end 29. The lower end of the link 28 is pivoted at 30 to one end of a rock arm 31 which rock arm is pivoted at 32 to the gear cover. The other end 33 of the rock arm engages in the upper end of the fork 48 for shifting the rod 22 axially. The plunger 26 is notched at 34 in which notch engages a spring-pressed key 35 which holds the plunger in its lowermost position when it has been depressed by the operator.

In operation in order to shift the ring 20 carrying the gear teeth 21 into engagement with the teeth 13 the plunger 26 is depressed. This rocks the arm 31 on its pivot 32 and moves the rod 22 to the right against the tension of a spring 36. The key 35 holds the plunger in its lowermost position and this locks the rod 22 to maintain the position and this locks the clutch elements in engagement one with the other. Since the gear 15 is always moved to the right when the gears are put into the position for reversing the car, the gear 15 will carry the clutch ring 20 to the right to bring the clutch elements into engagement with each other. This is as it should be for during reverse movement of the car the clutch 20 must positively drive the clutch 13 in a counterclockwise direction when viewing the elements from the left of the position in which they are shown in Figure 1.

In Figure 2 is shown a modified form of lever arrangement for operating the clutch shifting rod 37. In this form the rod has the fork 38 which engages the ring gear and the rod 37 is urged to the left by means of a spring 39 whenever it is released so that it can be moved in that direction. A lever 40 is pivoted at 41 in the bell housing and has its lower end engageable in a notch in the rod 37. The upper end of the lever 40 is attached to a manually operable rod 42. The rod 42 is provided with a spring 43 which is held between a suitable washer 44 and a pin 45. The rod 42 is notched at 46. If the operator wishes to lock the rod 42 in position to engage the clutch, he pushes it forward against the tension of the spring 43 and locks it in with the notch 46. A leaf spring 47 holds the bar 42 down to maintain the notch 46 in locked position.

It will be obvious to those skilled in the art that various changes may be made in my device without departing from the spirit of the invention and therefore I do not limit myself to what is shown in the drawing and described in the specification, but only as indicated by the appended claims.

Having thus fully described my said invention, what I claim as new and desire to secure by Letters Patent, is:

1. In an automobile transmission having free wheeling mechanism, the combination with a positive clutch of means for moving the positive clutch into operative position comprising a shaft operatively connected to said clutch, a pivoted lever having one end engaging said shaft and mounted on the automobile adjacent the driver's seat, a notched plunger for locking said lever in position, and a spring acting against said clutch to throw it out when said notched plunger is released, substantially as set forth.

2. In a gear transmission in combination an auxiliary positive clutch, a shaft for operating said clutch, a pivoted lever having its lower end in engagement with said shaft to operate it, a plunger slidably mounted on the vehicle and extending through the upper end of said lever, a pin in said plunger, a spring on said plunger between said pin and the end of said lever, said spring providing lost motion connection between said plunger and said lever, substantially as set forth.

3. In an automobile transmission having an auxiliary positive clutch element, a housing, a shaft slidably mounted in said housing for operating said clutch element, a lever engaging said shaft and manually movable in one direction to move the clutch element to operative position, a spring engageable with said shaft for moving it in the other direction to move the clutch element out of operative position, a plunger engaging said lever and having a notched portion for holding it in position to lock the clutch element in operative position, a spring on said plunger forming a yielding connection between the plunger and the lever to permit the lever to be moved independently of the said plunger to permit the shaft to be moved to move the clutch element to inoperative position without moving the said plunger, substantially as set forth.

4. In an automobile transmission having free wheeling mechanism the combination with a positive clutch of means for moving the positive clutch into operative position comprising a shaft operatively connected to said clutch, a lever pivotally mounted on said automobile having one end engaging said shaft, and having means resiliently connected to the other end for manually moving said clutch to operative position, and a spring acting against said shaft to move said clutch out of operative position.

5. In a motor vehicle transmission having free wheeling mechanism and relatively movable positive clutch elements the combination with one of said positive clutch elements of means for moving it into clutching engagement with the other comprising a shaft operatively connected to said clutch element, a lever pivotally mounted on said vehicle and having one end engaging said shaft and having resilient means connected to the other end for manually moving said clutch element to clutching engagement with its cooperating clutch element, and a spring acting against said shaft to move said clutch out of clutching engagement with its cooperating clutch element.

JOHN F. GAYLORD.